: 3,549,382
Patented Dec. 22, 1970

3,549,382
METHOD OF PREPARING POWDERED
MONOGLYCERIDE MATERIAL
Francis Frederick Hansen, 224 E. Poplar St.,
Walla Walla, Wash. 99362
No Drawing. Continuation-in-part of application Ser. No. 627,674, Apr. 3, 1967. This application May 15, 1968, Ser. No. 729,383
Int. Cl. A21d 2/16, 2/32
U.S. Cl. 99—91                                    2 Claims

ABSTRACT OF THE DISCLOSURE

A powdered antistaling compound for use in baking bread is prepared by forming a heated gel of monoglyceride and water, beating the gel while adding hydroxylated lecithin and a dry powdered edible solid such as flour, starch, skim milk solids or corn syrup solids and continuing the beating while the mixture cools to room temperature to produce a homogeneous creamy mixture which is then dried and converted to a powder.

---

This invention is for a monoglyceride product and process of preparing the same, and is a continuation-in-part of my copending application Ser. No. 627,674, filed Apr. 3, 1967, now abandoned.

My Pat. No. 3,282,705, granted Nov. 1, 1967, disclosed a product and method wherein distilled hard monoglyceride and hydroxylated lecithin are blended with water to produce a creamlike plastic dispersion in which the monoglyceride is reduced to a colloidal state, physically quite different from the original monoglyceride from which it is produced. The blend is made with a small amount of carbonate of soda being first reacted with the hydroxylated lecithin to neutralize the acidity of the hydroxylated lecithin. It appears that some presently unexplained reaction or other phenomenon takes place between the monoglyceride and the hydroxylated lecithin so neutralized, since these compounds do not separate when the blend is vigorously agitated in water. This plastic material, which closely resembles cosmetic cold cream, while being quite a superior antistaling addition to dough in the making of baked goods, is constituted with a substantial percentage of water, as appears from the detailed disclosure in said patent. As such, it must be shipped in drums, scooped out by the baker, and then weighed, and then dispersed at some stage into the dough mix. It may develop mold if not properly cared for. For these and other reasons I undertook to determine if the plastic compound disclosed in said patent could be converted into a dry powder without detriment to its utility.

In my Pat. No. 3,216,829, granted Nov. 9, 1965, wherein I disclosed a process for converting monoglyceride to a plastic gel, without, however, using hydroxylated lecithin, I described reducing the gel or dispersion to a powdered form by spray drying, wherein the plastic material was dispersed in water with a finely-divided additive, such as starch or flour. While I succeeded in producing a spray-dried product, it proved to be less effective as an antistaling additive than I had expected, and after several hours a slurry prepared from this powdered material would separate. It would recombine with water only with vigorous agitation, and I concluded that much of the usefulness of the original emulsion was destroyed by the heat required for spray-drying it. This, I suppose might be due to some change in the microcrystalline structure of the monoglyceride, since it is known to undergo even spontaneous changes in its crystal structure. In my later Pat. No. 3,282,705 for the monoglyceride-hydroxylated lecithin blend, which was even more heat-sensitive, I included no reference to drying, either by spray drying or other process, since the more plastic physical character of the blend indicated that it could not be successfully reduced to a dry, noncaking, nonsticking powder.

However, as disclosed in my copending application, Ser. No. 627,674, I did succeed in converting the monoglyceride-hydroxylated blend into a dry fine powder which proved to have remarkable antistaling properties in bread. This powder, when agitated with water, readily forms a milklike suspension which will stand for days without settling. The powder was produced by freeze-drying the emulsion in shallow pans, and then triturating or pulverizing the resulting freeze-dried cake. While it was unnecessary to use any additive, a more desirable product was secured by incorporating with the blend a finely-divided edible solid which would be compatible with or beneficial in bread dough, and which, contributed bulk and accelerated freeze-drying. Useful solids for this purpose are cereal or vegetable starch, skim milk powder, corn syrup solids, or other materials hereafter more fully described. The increased bulk is desirable because the Federal Bread Standards limit the use of monoglyceride to 0.5% of the weight of the flour. It is easier for the maker to weigh out and mix a larger bulk of dilute material to give the limit of monoglyceride, than to work with small volumes of more concentrated material.

Although freeze-drying resulted in an eminently satisfactory antistaling material, the cost of freeze-drying and the plant investment required to produce the product in commercial amounts needed by the baking industry was objectionable because of the expense so that I engaged in further research which has now enabled me to make a powdered product from the hydroxylated lecithin monoglyceride blend by drum-drying and by spray-drying. I have now succeeded in converting the monoglyceride-hydroxylated lecithin compound into a powder, which, like that prepared by freeze-drying, retains the utility of the creamlike emulsion itself as a bread improver and antistaling additive, provided that certain critical parameters are observed. It is my present belief that the good results which I have obtained with all three methods of drying is due to the fact that even though the lecithin lowers the melting point of the hard monoglyceride, the hydrophilic properties of the original plastic mix are retained.

The invention has for a principal object to provide a new product in the form of a powdered additive for use particularly, although not exclusively, in yeast-raised baked goods comprised principally of distilled hard monoglyceride combined with hydroxylated lecithin as produced in my Pat. No. 3,282,705.

The invention has a further principal object to provide a method of producing such a powdered material by freeze-drying, drum-drying, or spray-drying.

In all these drying processes, the emulsion of monoglyceride, hydroxylated lecithin and water is prepared as disclosed in Pat. No. 3,282,705. For freeze-drying, a powdered additive such as flour, starch, dry milk solids or the like is not necessarily used, but as above pointed out, the use of such a material facilitates drying and provides desirable added bulk.

With drum-drying and spray-drying, sufficient additional water is necessary in the emulsion to provide a flowable pumpable liquid, and a powdered additive such as starch, flour, etc., is functionally necessary, with the weight of the additive being at least equal to the dry weight of the monoglyceride and hydroxylated lecithin in the blend. Conventional drum-drying equipment is used, but with lower steam pressures in the drums than is usually used. With spray-drying, even more of the powdered additive material is required than with drum-drying to produce a satisfactory powdered product, the maximum ratio of monoglyceride and hydroxylated lecithin to the dry powdered additive being not more than about 35% of the monoglyceride and hydroxylated lecithin, dry weight to about 65% of the powdered additive. Here, too, additional water must be mixed into the initial gel or emulsion after it has formed to produce a flowable, pumpable liquid, and the common procedure of heating the liquid to a temperataure to 140° F. or higher temperature to accelerate evaporation of moisture before spraying it into the drying chamber must be at a low level.

In this specification and claims, the term "hard monoglyceride" means a commercial grade of distilled monoglyceride of an edible fat-forming fatty acid which is saturated or fully hydrogenated, and which has at least 85% of monoglyceride, with the balance being mostly diglyceride, with perhaps a trace or inconsequential amount of triglyceride. In the commercial form it is a solid at room temperature, usually sold as a granular product somewhat resembling granulated sugar. In the examples hereinafter appearing, distilled monoglyceride derived from hydrogenated cottonseed oil was used for the most part, but other monoglyceride of edible fat-forming fatty acids or mixtures thereof, animal and/or vegetable, may be substituted. Usually they are derived from fatty acids which contain between 16 and 20 carbon atoms to the molecule.

The preferred dry additive, particularly with drum or spray-drying, is wheat starch, since it resembles the free starch in wheat flour from which most baked goods are largely made, and which is abundant and economical, but other cereal or vegetable starch may be used, as may also wheat flour, especially cake flour which has a high percentage of free starch. Of the other powderlike additives hereinafter named, dried egg white and corn sugar solids, which may be readily used in freeze-drying, are less suitable in drum and spray-drying for the reason that a relatively water-insoluble powdered substance is preferred for these methods.

The specific drying procedures will now be described. Significant amounts of the freeze-dried material and drum-dried material have now been produced, particularly the drum-dried product, and extensively tested both in the laboratory and in commercial bakeries, using both conventional and continuous processes. Only test quantities of the spray-dried product have been prepared.

FREEZE-DRYING

Example I 3 ozs. of a commercial food grade of a distilled monoglyceride of a fat-forming fatty acid comprising 90% or higher monoglyceride with the balance being diglyceride and triglyceride, and which was solid at room temperature, were melted and heated to 200° F. In a separate vessel 3 ozs. of water was brought to a boil.

At the same time I placed 5 ozs. of water and 1 oz. of hydroxylated lecithin in a double boiler. To this was added ⅛ oz. of baking soda.

The 3 ozs. of water which had reached the boiling point was placed in a mixing bowl that had been heated to about 200° F., then the melted monoglyceride was quickly added. It was beaten with an electric beater having double beaters at about 1000 r.p.m. for 2 minutes. Then the mixture of water, hydroxylated lecithin and bicarbonate of soda which had been heated in the double boiler to between 175° and 180° F. was added to the contents of the mixing bowl as the mixing continued, and beating was continued until the mix had cooled to about 100° F., at which time it was a smooth, creamy paste strongly resembling cosmetic cold cream.

This was the procedure as disclosed in Example 1 of my Pat. 3,282,705.

Subsequently, the plastic cream was spread into a freezing tray to a depth of roughly one-half inch and the tray was placed in a cabinet where the inside temperature was maintained by a freezing coil between —40° F. and —60° F. under a high vacuum. The cabinet was provided with what is termed an "energizer system" whereby the shelves holding the trays were heated by circulating low freezing liquid, such as oil, held to a temperature of about 100° F. This input of heat hastens the drying and tends to keep the water in the product from stagnating, so that it is more readily evaporated.

When the water had been evaporated to about 10% total remaining water, the trays were removed and the product was a soft cake which was easily broken or crumbled as the product was removed from the tray. The drying time was about 3 hours.

The freeze-dried product was then powdered or triturated.

While the product retained its powdered state, it was not as free-flowing as would be desirable, tending to retain a steep angle of repose, when the vessel in which it was placed was tilted.

Material so prepared was then sent to a commercial bakery testing laboratory where it was used in a bread formula in a bread mix in the amount of 1% of the powder to the weight of the flour. After three days the bread was subjected to compressometer testing for a 5-day period. The compressibility registered 64.3% on the third day after baking, which was the first day of testing, and on the fifth day, which was the seventh day after baking, it was 52.3%, or a difference in compressibility of only 12 percentage points. The bread was rated "excellent" for softness, and "very good" on a total score.

Example II

An emulsion was prepared as described in Example I, but there was introduced into the emulsion at the time of mixing and along with the hydroxylated lecithin 2 ozs. of regular skim milk powder and 6 additional ozs. of water. It was freeze-dried in the same manner and used in the baking test in the amount of 2% of powder to the weight of the flour. The bread was rated "excellent" from the standpoint of softness or antistaling, and "excellent" on the total score. The compressibility on the first day of testing was 64.3%, and on the final day of testing, 48.3% with an average of 57.64%.

The product so made was similar in appearance to the product of Example I, but when it was reduced to a powder, it was more free-flowing and of greater bulk, so that it could be measured and poured more readily. Two percent of the powder was used in this test because of the monoglyceride being diluted with the dry skim milk.

Example III

Again a plastic cream-like emulsion was prepared as described in Example I, and there was incorporated into the emulsion with the lecithin 1 oz. of skim milk powder from which most of the lactose sugar content had been removed. This product powdered very readily and was free-flowing, and considerably shortened the freezing time because the additional water described in Example II was not used, the skim milk product being introduced directly into the emulsion, without the additional water other than that to which the lecithin had been added.

Example IV

A sample was prepared as described in Example III, but instead of using 1 oz. of skim milk powder, there was substituted 1 oz. of corn starch and 1 oz. of corn syrup solids. This material was also freeze-dried, the fragmented product was easily powdered both by pressing it through a fine screen, and by powdering it with a laboratory type mortar with a pestle.

Example V

A fifth example was prepared the same as in the previous two examples, but there was incorporated into the emulsion 1 oz. of dry skim milk powder and 1 oz. of corn syrup solids. These dry materials, as in the previous two examples, were incorporated directly into the emulsion without additional water.

All of the samples above described could be reconstituted by mixing them with water at 60° F., but when a substance such as dry milk powder, corn syrup solids, wheat or other starch, or milk powder substantially devoid of lactose sugar or a mixture thereof was employed, they were reconstituted much more readily than Example I. Also powder prepared with one of the herein-named additives was more freely flowing and more readily poured than was the freeze-dried product of Example I.

Example VI

An emulsion was prepared as in Example I, except that 4½ ozs. of water was put in the double boiler to which the lecithin and sodium bicarbonate was added, and there was also added ½ oz. of vegetable plastic shortening and the mixture heated to 200° F., and then the procedure of Example I was followed. Lard may be substituted for plastic vegetable shortening.

Example VII

In another instance, much the same procedure was followed as in the preceding example, except that 5 ozs. of water was used along with the hydroxylated lecithin and plastic vegetable shortening. To the emulsion there was then added 1 oz. corn syrup solids, ¾ oz. partially delactosed skim milk powder, and ¼ oz. of dry corn starch. The freeze-drying procedure of Example I was followed by pulverizing the freeze-dried caked material. The material formed a satisfactory powdered product, as did the material of Example VI, insofar as appearance was concerned, but baking tests showed no advantage over using powdered monglyceride lecithin prepared without shortening, but with shortening being used in the usual manner in the dough. In other words, freeze-drying the combined shortening and emulsifier together showed no special advantage.

The problem which I anticipated was that in freeze-drying, the shortening would sublime and foul the interior of the freezer as it does in experiments made by me with freeze-drying a product combining monoglyceride and shortening without the hydroxylated lecithin. The hydroxylated lecithin appears to prevent sublimation of the shortening, and it also substantially reduces the freezing time, since the comparative material having approximately the same amount of shortening but no hydroxylated lecithin took a much longer time and, as stated above, much of the shortening was removed and deposited on the colder areas of the freezer.

The addition material which is introduced into the emulsion must be of a character such that when it is dried, it will be a powder, or easily revert to a powdered condition from the freeze-dried cake. It is not undesirable in freeze-drying that at least part of the addition material be water-soluble, and that part which is not soluble be of such fineness that it will remain in suspension in water for some considerable length of time and not immediately settle out.

Moreover the addition material must be one which is edible, and which may be incorporated into bread under under the standards established by the Federal Department of Health, Education and Welfare, and which is of an amorphous character rather than one which crystallizes into large crystals when it is subjected to freeze-drying. It should be a substance which is readily available and not too expensive for the purpose. Dried egg white is satisfactory, but for commercial bakeries would be too expensive.

The freeze-drying equipment herein described is commercially available, and my invention is not confined to the use of this particular apparatus, although it has proved to be a very satisfactory apparatus. As indicated above, I prefer to spread the emulsion with the addition material in relatively shallow layers in the trays rather than to try to dehydrate a thick, lump-like mass, and the freeze-dried product may retain between 5% and 12% of moisture. The exact area of criticality on the maximum moisture content has not been fully determined, but 12% of moisture is the usual content of flour, which of course does not mould as long as it is otherwise kept dry. On the other hand, there is little advantage in dehydrating below about 5% of moisture since to do so adds considerably to the expense of freeze-drying, and the product is less readily reconstituted in water when the moisture content is reduced too much. The preferred amount of retained moisture may vary with different formulae, but the moisture should be at a level where the freeze-dried cake will readily powder and not develop mould or rancidity. It should be high enough so that the product may be readily reconstituted with water at about 60° F.

DRUM-DRYING PROCEDURE

In drum-drying I combine with the monoglyceride-hydroxylated lecithin preparation finely-divided powdered additive and additional water in sufficient amount to form a liquid that may be pumped. The mixture is thoroughly agitated and then supplied to a drum-drier. This may conveniently be done, as in the preceding examples, but initially introducing the starch or other additive to the second volume of water that is added after the first hot water and monoglyceride are combined as disclosed in Pat. 3,282,705.

In a typical example, sufficient water is incorporated into the starch-hydroxylated mixture so that the total water is in the range of about 50% to 75% by the weight of the mix. This excludes such small amount of moisture as may be present in or inherent in the starch, sometimes referred to as the "equilibrium moisture content." The wheat-starch which was used as a powdered additive was approximately equal in weight to the dry weight of the monoglyceride and hydroxylated lecithin. The lower amount of water, around 50%, may be used if the wheat starch is incorporated in the process of making the monoglyceride-lecithin-water emulsion as disclosed in Pat. 3,282,705, whereas if the plastic creamlike mix is first made and allowed to set for several hours or more, more water, up to the upper limit of the range above described, may be needed to produce a pumpable mix.

A 12" x 12" drum-drier revolving at about 4.6 r.p.m. heated by steam inside the drum at pressures between 10 to 15 p.s.i. was first successfully used. At 12 p.s.i., indicating a drum surface temperature of around 240° F. with a feed rate of mix to the drum of 135 cc. per minute, flakes were formed which were easily removed from the drum. With a feed rate to the dryer of 135 cc./minute, the drum was not completely covered, and feed rates nearly twice this may easily be reached. In this drum-drier, having a single drum, the doctor blade for removing the flakes was on the down side of the drum.

In subsequent operations using a commercial two-drum drier, the liquid mix, containing about 50% water, is discharged into the bight of the confronting rolls, forming flakes on both rolls. However here, as with the 12" x 12" drier, the steam pressure in the rolls is kept as low as practical to secure evaporation of the water at a commercially productive rate, i.e., between 10 and 15 lbs. p.s.i.

The flakes, when cold, could be readily pulverized in most any pulverizing grinder, but in a conventional hammermill some plugging at ambient temperatures above 70° F. occurs. Even using a hammermill in place of other modes of pulverizing, the flakes could be readily pulverized if a small additional amount of starch was used in the mill along with the flakes. Also, if a slightly higher ratio of starch to monoglyceride than equal percentages was used, the flakes could be powdered much more readily.

The steam pressure in the drum should be of a relatively low order. Below 10 p.s.i. does not give adequate drying, and above 15 p.s.i. is likely to impair the product. The speed of rotation, or the rate of feed, must be slowed down as the steam pressure is lowered, or the product will not be sufficiently dry. The hard monoglyceride, even without being combined with hydroxylated lecithin, which tends to slightly lower the melting point of the monoglyceride in the combination, is around 160° F. It would therefore be expected that the monoglyceride-hydroxylated lecithin would melt to a condition resembling an oil, as indeed it does where no additive such as wheat starch is used, but with not less than an equal weight of wheat starch or like additive to the dry weight of the combined monoglyceride and hydroxylated lecithin an excellent dry flaked product results with no apparent melting of the monoglyceride. This is probably due in part to the high rate of heat loss due to the rapid evaporation of water; the action of the starch or like additive in reducing the water into thin films around the starch particles, and other complex phenomena, such as some gellation of the starch causing it to combine with the monoglyceride as it subsequently does in baking. If the weight of starch or similar additive is much less than 50% of the original weight of the monoglyceride, the flakes become soft and sticky, and the product loses much of its beneficial qualities, as it does where there is no powdered additive at all. In any event, powdering the flakes may be more easily accomplished if they are cooled to near zero or colder, and then charged into a pulverizing mill.

When the flakes made from 50% or more of cereal starch or like additive in the manner above described are pulverized to about 80 mesh and finer, it provides an effective anti-staling agent for bread comparable to the freeze-dried product. To some degree it is not quite as good as the freeze-dried product, but commercially the difference is not significant considering the overall economy of the drum-drying process. The drum-drying operation may be controlled to leave in the flakes, moisture ranging from a trace to about 12%. As above pointed out, for practical purposes the removal of water should be below that at which the pulverized product will develop mould, but be somewhat more than a trace. This is at a level followed in freeze-drying, that is, not substantially above 12%, or below 3%. This compares to the water in wheat flour which does not mould in dry storage. A preferred water residue is in the range of 4% to 6%.

SPRAY DRYING

As discussed above, my experience with a spray-dried product as described in Pat. 3,216,829 indicated that the successful production of a spray-dried blend of the monoglyceride and hydroxylated lecithin appeared doubtful. The fact that the blend of monoglyceride and hydroxylated lecithin melted at a lower temperature than the straight monoglyceride, and that the blend material tended to be slightly sticky was an indication to me that spray-drying would not be successful.

However, experiments were run under my direction at Washington State University in a research type of spray-drier used for drying milk. Best results were obtained where there were about two parts by weight of additive to one part by weight of monoglyceride-hydroxylated lecithin (dry weight) which, however, had previously been prepared as a plastic mix in accordance with Pat. 3,292,705. Specifically 65% of the powdered additive was used with 35% of the monoglyceride-hydroxylated lecithin blend. Water was added to make a pumpable mix so that the total water, excluding the inherent moisture in the wheat starch used as the additive, was 69% of the total mix. This preparation, after being thoroughly mixed, was heated to 100° F. as the optimum temperature. Experiments indicated that temperatures above about 140° F. were too high. The warmed liquid was atomized into a spray chamber at from 10–15 p.s.i. into a downflowing current of hot gases generated from a gas burner. Sufficient air was introduced that the average temperature in the chamber from top to bottom was about 155° F., varying between about 175° F. at the top to 140° F. near the bottom. The average outlet temperature of the gases from the offtake at the bottom was 125° F. The oulet gas and air along with the dried particles were withdrawn at the bottom into a cyclone. Because of the low temperature and the increased flow of air necessary to effect evaporation of water from the mix but to avoid overheating, the monoglyceride-hydroxylated lecithin was not melted. It was found that a large amount of the material adhered to the walls of the spray chamber, which was small compared to a commercial production apparatus. The adhering material could, however, be readily brushed away as a floculant material. A larger spray chamber would have avoided this. Each type of spray-drying apparatus will have its own operating characteristics, depending on size, location of the spray nozzle and rate of product input, but the critical parameters require preheating the pumpable mix preferably no higher than about 125° F., and preferably around 100° F.; utilizing a starch to monoglyceride-lecithin ratio of not less than about 65% to about 35%, some variation being permissible where the ambient air is of low humidity. The maximum drying chamber temperature is around 175° F. near the zone of first contact with the atomized spray with the outlet air temperature well below this level. One skilled in he art, knowing this, will easily regulate heated air flow through the drier to reduce the moisture content to a level below that as which mould will occur, preferably between 4% and 6%, without melting the blend of monoglyceride and hydroxylated lecithin by preheating or in the spraying chamber.

Here, as in drum-drying, the powdered additive protects the combined monoglyceride and lecithin and aids in the rapid evaporation of the moisture. With rapid evaporation, evaporative cooling of the material occurs. In any case more of the powdered additive is necessary with spray-drying, than with drum-drying or freeze-drying. Moreover, with spray-drying the additive is preferably a powder which is dispersible in water but not soluble. A flourlike powder such as starch or flour accelerates drying in the lower temperature range. More than about 35% of the monoglyceride-lecithin product could not be satisfactorily used in spray-drying. Because of the lower percentage of monoglyceride-lecithin blend that may be used, the spray-dried product is commercially less satisfactory than the freeze-dried or drum-dried product.

In the foregoing description I have disclosed incorporating the powdered or dry additive to the emulsion while it is being cooled and beaten. However the emulsion may be freeze-dried as disclosed in Example I, and then the dry addition materials can be thoroughly mixed with the freeze-dried product during the powdering of the freeze-dried cake, or the subsequently-added powder, providing the free-flowing characteristic to the complete powder and yield a product that is more readily reconstituted in water at about 60° F. than a triturated freeze-dried blend with which no powdered additive is used.

In addition to dry skim milk, dry skim milk from which lactose sugar has been extracted, corn syrup solids, and corn starch or mixtures of these, there may also be used other very fine cereal flour or edible starches such as wheat starch and sodium lactate. Casein has been tried by me, but it is of a gummy nature and not very satisfactory, and this is also true of lactobumin. Spray-dried whole milk is not desirable because the presence of the butter fat may promote rancidity, even though the hydroxylated lecithin is an antioxidant.

For freeze-drying, the best powdered materials are dry skim milk solids, dry skim milk substantially free of lactose sugar, corn syrup solids either alone or in combination with the others herein named, cereal or vegetable starch and flour. For drum-drying and spray-drying, corn syrup solids are less desirable, and for all-around purposes in baking, wheat starch is preferable.

From the foregoing it will be seen that a flowable powdered product comprising the monoglyceride-lecithin combination of my earlier Pat. No. 3,282,705 may be produced by freeze-drying, drum-drying and spray-drying processes, but in the drum-drying and spray-drying procedures a powdered ingredient must be used, and with all three methods is desirably used to give bulk to the product, and more important, to keep it free-flowing and readily dispersable even in warm weather. The selection of the powdered ingredient or mixtures thereof may depend not only on the procedure followed, but on the purpose for which the product is used, economy and other factors.

What is claimed is:

1. The method of preparing an antistaling compound for incorporation into yeast-raised baked products which comprises effecting a combination of hydroxylated lecithin and monoglyceride of an edible fat-forming fatty acid in the ratio of about 10% to 30% by weight of hydroxylated lecithin to about 90% to 70% by weight of monoglyceride while both are at a temperature ranging between about 150° F. and 180° F., mixing with the resulting combined product a roughly equal weight of dry additive selected from the group consisting of cereal starch, vegetable starch, flour and dry skim milk, including dry skim milk from which lactose has been substantially removed and converting the mixture from a temperature above the melting point of the combined hydroxylated lecithin and monoglyceride to a dry comminuted product containing from a trace to not more than 15% of moisture.

2. The method of preparing a powdered anti-staling compound for use in baking which comprises:
   (a) forming an emulsion of distilled monoglyceride of an edible fat-forming fatty acid and water by separately heating equal weights of monoglyceride and water to a temperature above the melting temperature of the monoglyceride and combining them to form a gel,
   (b) beating the gel while also adding additional water heated to about 175° F. in which is mixed hydroxylated lecithin in the ratio of about one part of hydroxylated lecithin to three parts of monoglyceride and bicarbonate of soda in the range from 0 to about 3% by weight of the weight of the monoglyceride, and dry powdered edible solid in the ratio of about 65% of the edible solid to 35% by weight of the combined monoglyceride and hydroxylated lecithin and continuing the beating as the mixture cools to a temperature to produce a homogenous creamy mixture, adding sufficient water to the mixture to form a pumpable slurry, spray-drying the slurry by spraying it under pressure into a spray chamber through which heated gases are circulated at a temperature of about 175° F. at the area where the spray is introduced into the gases and air and wherein the gas temperature lowers as the removal of water from the spray continues, and maintaining the gases and air and sprayed product in contact until the moisture content of the product is between 12% and 3%.

References Cited
UNITED STATES PATENTS

| | | | |
|---|---|---|---|
| 2,827,378 | 3/1958 | Glabe | 99—91X |
| 3,216,829 | 11/1965 | Hansen | 99—118 |
| 3,282,705 | 11/1966 | Hansen | 99—118 |

MAURICE W. GREENSTEIN, Primary Examiner

J. R. HOFFMAN, Assistant Examiner

U.S. Cl. X.R.
99—86, 92